US012168466B2

(12) United States Patent
Gillis et al.

(10) Patent No.: US 12,168,466 B2
(45) Date of Patent: Dec. 17, 2024

(54) OPEN TOP GONDOLA RAILCARS

(71) Applicant: Gunderson LLC, Portland, OR (US)

(72) Inventors: Michael Gillis, Portland, OR (US); Gregory J. Saxton, Portland, OR (US)

(73) Assignee: Gunderson LLC, Lake Oswego, OR (US)

(*) Notice: Subject to any disclaimer, the term of this patent is extended or adjusted under 35 U.S.C. 154(b) by 741 days.

(21) Appl. No.: 17/476,644

(22) Filed: Sep. 16, 2021

(65) Prior Publication Data

US 2023/0083126 A1 Mar. 16, 2023

(51) Int. Cl.

| | |
|---|---|
| ***B61D 17/10*** | (2006.01) |
| ***B61D 3/00*** | (2006.01) |
| ***B61D 7/00*** | (2006.01) |
| ***B61D 7/16*** | (2006.01) |
| ***B61D 7/32*** | (2006.01) |
| ***B61F 1/12*** | (2006.01) |
| *B08B 9/08* | (2006.01) |
| *B61D 3/06* | (2006.01) |
| *B65D 90/00* | (2006.01) |

(52) U.S. Cl.

CPC ............... *B61D 17/10* (2013.01); *B61D 3/00* (2013.01); *B61D 7/00* (2013.01); *B61D 7/16* (2013.01); *B61D 7/32* (2013.01); *B61F 1/12* (2013.01); *B08B 9/08* (2013.01); *B61D 3/06* (2013.01); *B61D 5/08* (2013.01)

(58) Field of Classification Search

CPC ... B61D 3/00; B61D 3/06; B61D 5/08; B61D 7/00; B61D 7/16; B61D 7/32; B61D 17/00; B61D 17/04; B61D 17/08; B61D 17/10; B61F 1/12; B08B 9/08

See application file for complete search history.

(56) References Cited

U.S. PATENT DOCUMENTS

| | | | |
|---|---|---|---|
| 2,114,743 | A | 4/1938 | Lohrman |
| 2,367,718 | A | 1/1945 | Farrell |
| 2,615,751 | A | 10/1952 | Black |

(Continued)

FOREIGN PATENT DOCUMENTS

| | | | |
|---|---|---|---|
| CN | 203637833 | U | 6/2014 |
| CN | 209667081 | U | 11/2019 |

(Continued)

*Primary Examiner* — Zachary L Kuhfuss
*Assistant Examiner* — Cheng Lin
(74) *Attorney, Agent, or Firm* — Chernoff, Vilhauer, McClung & Stenzel, LLP

(57) ABSTRACT

Open top gondola railcars and closure assemblies for cleanout openings of those railcars are disclosed. In some embodiments, the closure assembly includes a closure member sized to be received in a cleanout opening and to span a substantial portion of the cleanout opening to define at least one gap between a closure perimeter and a floor perimeter. The closure assembly additionally includes a sealing member fixedly attached to, or formed with, the closure member. The sealing member spans between the floor perimeter and the closure perimeter to cover the at least one gap. The closure assembly further includes a tethering member having opposed first and second end portions. The first end portion is fixedly attached to the closure member and the second end portion is attached to one of the floor or a cross bearer of the open top gondola railcar.

12 Claims, 5 Drawing Sheets

(56) References Cited

U.S. PATENT DOCUMENTS

| | | | | | |
|---|---|---|---|---|---|
| 2,674,383 | A | | 4/1954 | Sanford | |
| 2,703,655 | A | | 3/1955 | Sanford | |
| 3,191,549 | A | | 6/1965 | Adler | |
| 3,217,661 | A | | 11/1965 | Kemp | |
| 3,257,134 | A | | 6/1966 | Boyd et al. | |
| 3,800,472 | A | | 4/1974 | Nagy | |
| 4,114,785 | A | * | 9/1978 | Dugge | B61D 7/18 105/283 |
| 4,645,166 | A | | 2/1987 | Checkley et al. | |
| 5,490,464 | A | | 2/1996 | Rudibaugh et al. | |
| 5,507,235 | A | | 4/1996 | Dugge et al. | |
| 5,622,117 | A | | 4/1997 | Burian et al. | |
| 5,738,285 | A | * | 4/1998 | Anderson | F16L 55/1141 222/545 |
| 7,434,519 | B2 | | 10/2008 | Forbes et al. | |
| 7,461,600 | B2 | | 12/2008 | Forbes et al. | |
| 7,757,611 | B2 | | 7/2010 | Forbes et al. | |
| 8,025,014 | B2 | | 9/2011 | Forbes et al. | |
| 8,596,203 | B2 | | 12/2013 | Forbes et al. | |
| 9,156,478 | B2 | * | 10/2015 | Forbes | B61D 17/08 |
| 10,017,191 | B2 | | 7/2018 | Single | |
| 10,259,472 | B2 | | 4/2019 | Veit | |
| 10,549,790 | B2 | | 2/2020 | Marchlewski et al. | |
| 10,640,940 | B2 | | 5/2020 | DeLaine, Jr. | |
| 10,710,612 | B2 | * | 7/2020 | Single | B61D 19/001 |
| 2002/0100390 | A1 | * | 8/2002 | Jwuc | B61D 17/005 105/247 |
| 2006/0207472 | A1 | * | 9/2006 | Creighton | B61D 17/043 105/396 |
| 2021/0039685 | A1 | * | 2/2021 | Josephson | B61D 17/04 |

FOREIGN PATENT DOCUMENTS

| | | | | | |
|---|---|---|---|---|---|
| GB | 235889 | A | | 9/1925 | |
| RU | 2271292 | C2 | | 3/2006 | |
| RU | 172921 | U1 | | 7/2017 | |
| RU | 175641 | U1 | * | 12/2017 | B61D 3/00 |
| RU | 184974 | U1 | * | 11/2018 | |
| RU | 190937 | U1 | | 7/2019 | |
| WO | 2015071010 | A1 | | 5/2015 | |

* cited by examiner

OPEN TOP GONDOLA RAILCARS

BACKGROUND OF THE INVENTION

The present application relates to railroad cars and, in particular, to cleanout door or ports for railroad cars, such as open top gondola railcars.

Open top gondola railcars are used for transporting loose bulk materials, such as gravel, sand, coal, petroleum coke, wood chips, etc. Because of their low side walls, they also are suitable for the carriage of high-density cargo or bulky items, such as scrap metal, steel plates, coils, and prefabricated sections of rail track. Open top gondola railcars generally include cleanout ports that are located on the sidewalls or side structure for removing small amounts of debris from the car and/or to wash out the railcar interior. However, those ports can leave a ledge that traps unwanted debris and can create high stresses in the structure.

What is desired, then, are open top gondola railcars having improved cleanout ports that allow for better removal of debris to prevent accumulation of that debris in the railcars.

SUMMARY OF THE INVENTION

An open top gondola railcar as disclosed herein provides answers to some of the previously-mentioned shortcomings of previously known open top gondola railcars.

In one embodiment, the open top gondola railcar includes a floor with one or more cleanout openings, side walls, end walls, spaced cross bearers attached to the floor, which collectively define a car body having an internal compartment. The open top gondola rail car also includes a pair of wheeled trucks that support the car body and a closure assembly for each of the cleanout openings.

In one embodiment, the closure assembly includes a closure member sized to be received in the cleanout opening, a sealing member, and a tethering member attached to the closure member.

In one embodiment, the interference member may be a cable or a chain.

In one embodiment, the closure assembly includes a locking mechanism that secures the closure member in the cleanout opening.

In one embodiment, the locking mechanism includes a first planar fixedly attached to the closure member and having a first hole, second and third planar flanges fixedly attached in a spaced relationship to the floor and/or cross bearers and having second and third holes, respectively, and a locking member sized to be received in the first, second, and third holes.

The foregoing and other objectives and features will be more readily understood upon consideration of the following detailed description taken in conjunction with the accompanying drawings.

BRIEF DESCRIPTION OF THE SEVERAL DRAWINGS

DETAILED DESCRIPTION OF PREFERRED EMBODIMENTS

Figure 1:
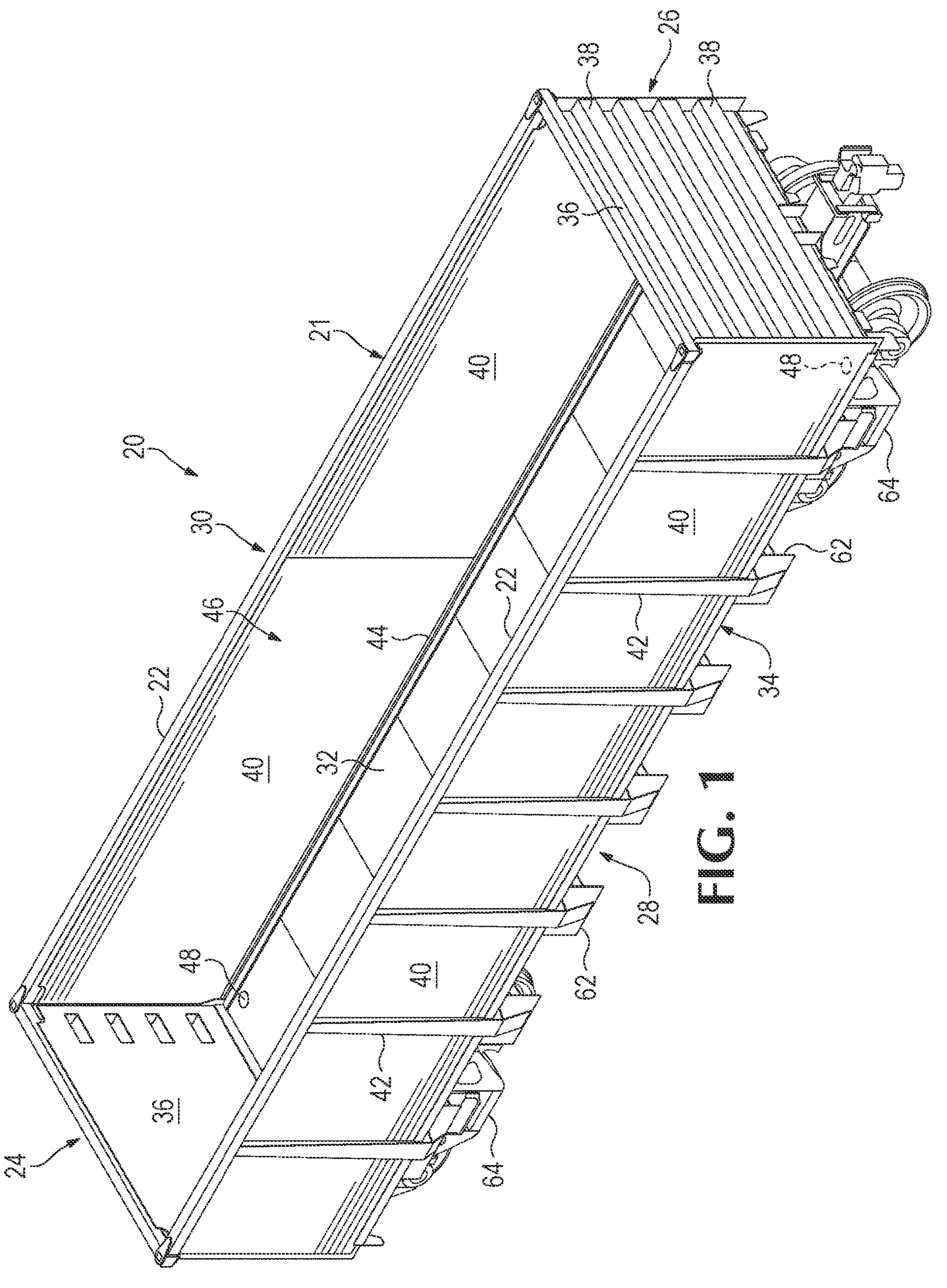
FIG. 1 is a top isometric view of an example of an open top gondola railcar of the present disclosure.
Figure 2:
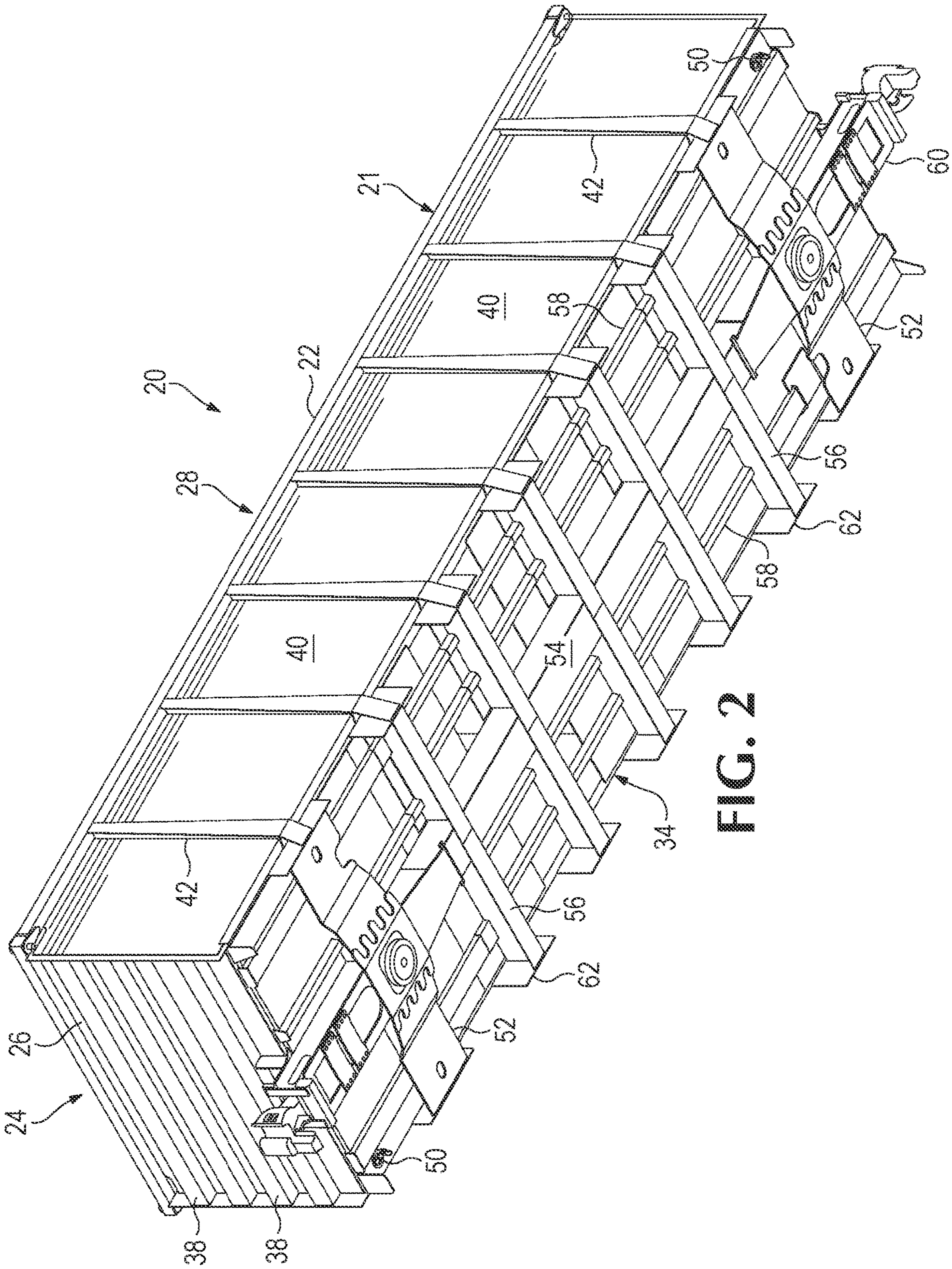
FIG. 2 is a bottom isometric view of the open top gondola railcar of FIG. 1 shown without wheeled trucks.

Referring now to the drawings that form a portion of the disclosure herein, FIGS. 1-2 shows an open top gondola railcar 20. The gondola railcar includes a car body 21 having top chord sections 22, opposed end walls 24 and 26, opposed side walls 28 and 30, a floor 32, and an underframe assembly 34. End walls 24 and 26 are each generally formed of end sheet 36 and cross supports 38. End sheet 36 can be formed of a single sheet, two sheets, or a plurality of coupled sheet materials, extending from top chord 22 to floor 32. Side walls 28 and 30 are each generally formed of a side sheet or plate 40, side stakes 42, and a side sill 44. Side sheet 40 can be formed of a single sheet, two sheets, or a plurality of coupled sheet materials, extending from top chord 22 to side sill 44. Side stakes 42 are coupled to top chord 22 and side sheet(s) 40 and aligned with cross braces or cross bearers of underframe assembly 34.

End sheets 36 and side sheets 40 are attached to floor 32 to define an internal compartment 46 therebetween. Floor 32 includes one or more cleanout openings 48 and a closure assembly 50 for or associated with each of those openings, as further discussed below. Underframe assembly 34 includes a bolster 52, a center sill 54, cross bearers 56, and longitudinal stringers 58. The center sill runs the length of the car with draft sills 60. Cross bearers 56 extend from center sill 54 and include vertical connection plates 62 for coupling to side stakes 42. Open top gondola railcar 20 also includes a pair of wheeled trucks 64 located adjacent the opposed longitudinal ends of car body 21.

Figure 3:
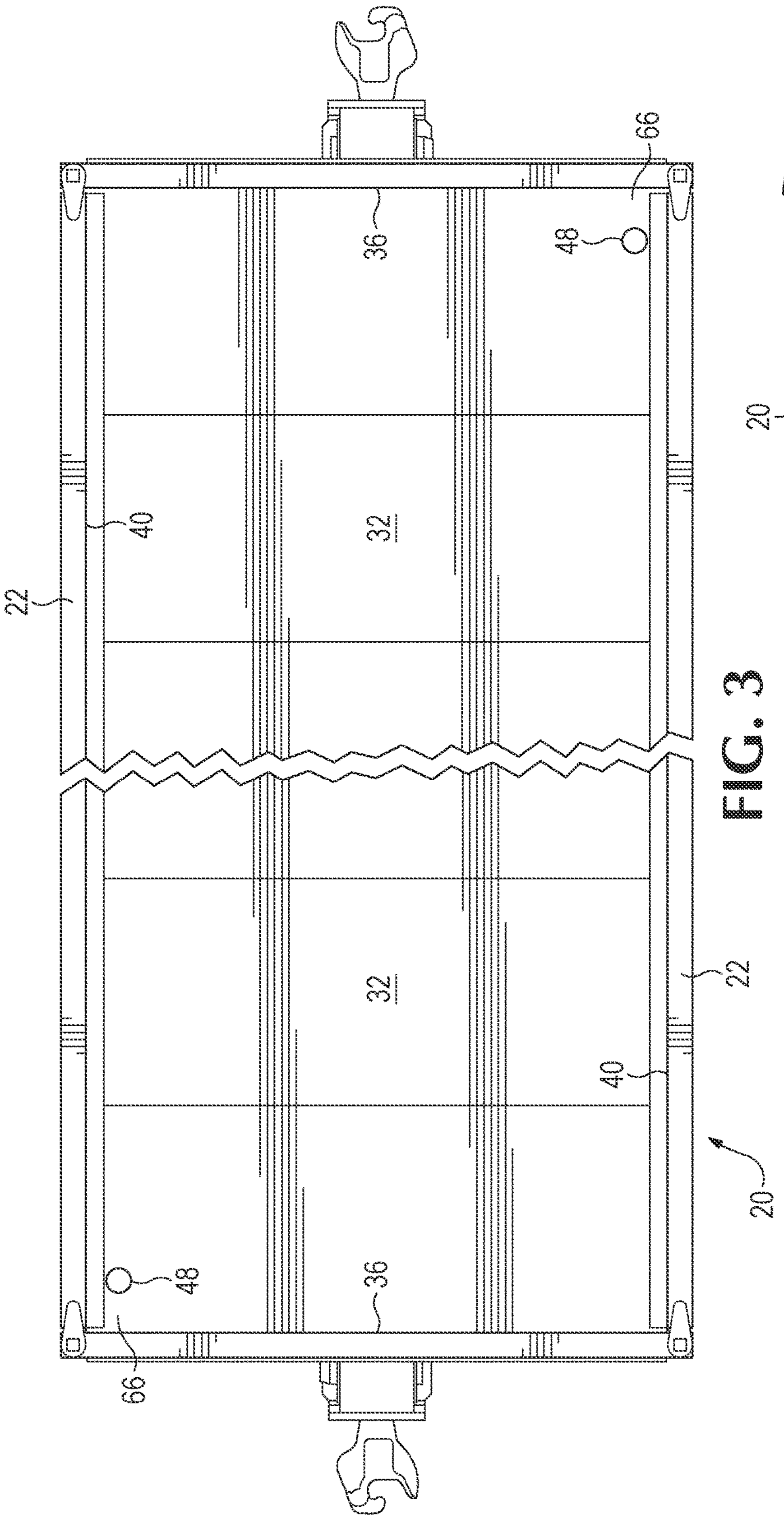
FIG. 3 is a top view of the open top gondola railcar of FIG. 1 showing one example of cleanout openings.
Figure 4:
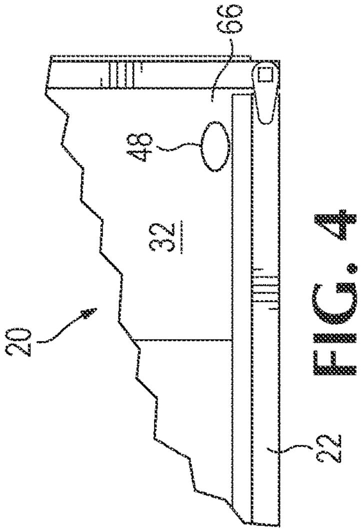
FIG. 4 is a partial top view of the open top gondola railcar of FIG. 1 showing another example of a cleanout opening.

Referring to FIGS. 3-4, floor 32 includes two cleanout openings 48 that are located adjacent corners 66 of floor 32. In other words, each cleanout opening 48 is adjacent a respective end wall and side wall that define respective corner 66. Other examples of floor 32 may include one, three, four, or more cleanout openings and/or may have cleanout openings in other locations of floor 32. Cleanout openings 48 may be any suitable shape(s). Cleanout openings 48 are circular in FIG. 3 and elliptical in FIG. 4. Other examples of cleanout openings 48 may include shapes other than circular or elliptical, such as oval, square, rectangular, etc. In the example shown in FIG. 3, floor 32 includes cleanout openings 48 of the same shape. However, in other examples, floor 32 may include cleanout openings 48 that are differently shaped from each other.

Figure 5:
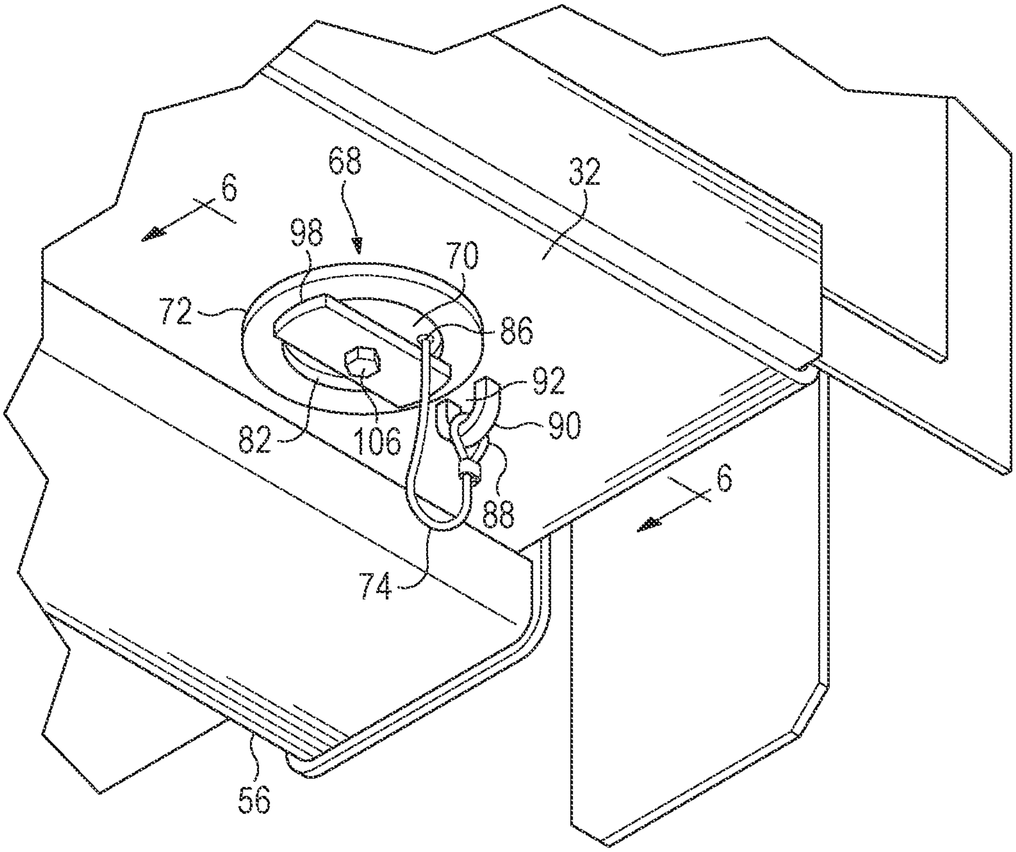
FIG. 5 is a partial isometric view of the open top gondola railcar of FIG. 1 showing an example of a closure assembly for the cleanout opening of FIG. 3.
Figure 6:
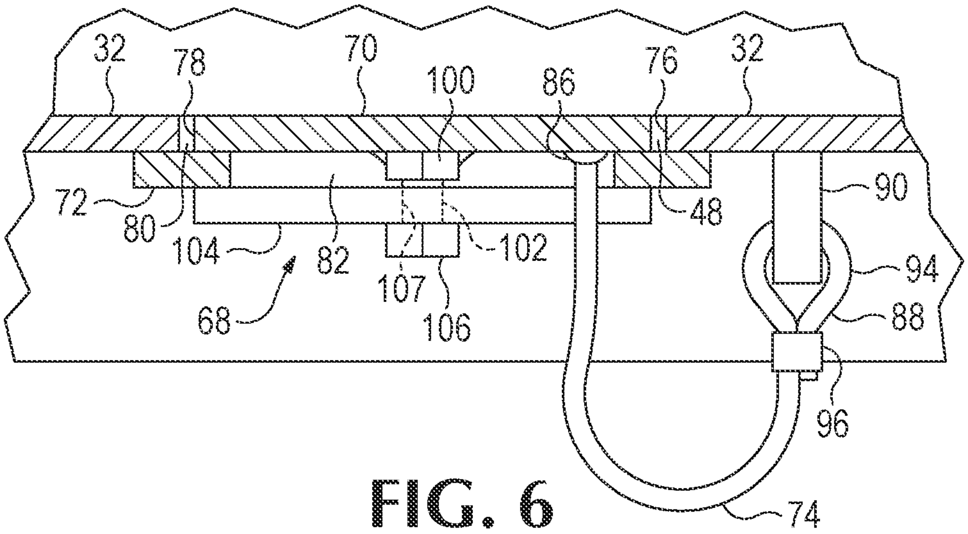
FIG. 6 is a sectional view of the closure assembly of FIG. 5, showing the interference member of FIG. 5 taken along lines 6-6 in FIG. 5.

Referring to FIGS. 5-6, a first embodiment of closure assembly 50 for cleanout opening 48 is generally indicated at 68. The closure assembly includes a closure member 70, a sealing member 72, and a tethering member 74. Closure member or cover member 70 corresponds to the shape of cleanout opening 48. In the example shown in FIGS. 5-6, clean-out opening is circular so closure member 70 has a cylindrical shape having a thickness or height that is the same as the thickness or height of a floor perimeter 76 that defines cleanout opening 48. Because closure member 70 is the same thickness or height, closure member 70 is co-planar with floor perimeter 76 when received in cleanout opening 48. Closure member 70 includes a closure perimeter 78 and is sized to be received in cleanout opening 48 and to span a substantial portion (or almost all) of the cleanout opening, such as about 97%, 98%, or 99% of the diameter. In other words, the width or diameter of the closure member is only slightly less than the width or diameter of cleanout opening 48 leaving only a small gap 80 between floor perimeter 76 and closure perimeter 78.

Sealing member 72 is fixedly attached to, or formed with, closure member 70 and is sized to span between floor perimeter 76 and closure perimeter 78. In other words, the sealing member covers gap 80 to seal cleanout opening 48 and prevent material from leaving internal compartment 46 via cleanout opening 48. Sealing member 72 contacts floor perimeter 76 when closure member 70 is received in cleanout opening 48. Additionally, sealing member 72 includes a hole 82 allowing tethering member to be attached to closure member 70. The sealing member can be any suitable shape(s). In the example shown in FIGS. 5-6, sealing member 72 is annular or ring-shaped that is fixedly attached to, or formed with, closure perimeter 78 of closure member 70.

Tethering member 74 may be a cable, chain, and/or other structure having opposed longitudinal end portions 86 and 88. End portion 86 is received in hole 82 and is fixedly attached to closure member 70, while end portion 88 is attached to floor 32 and/or one or more cross-bearers 56. End portion 88 may be directly attached to the floor or the cross-bearer(s), such as via one or more welds, or may be attached to one or more structures that are attached to, fixedly attached to, or formed with, the floor and/or cross bearer(s). In the example shown in FIGS. 5-6, a retainer member 90 is fixedly attached to floor 32. Retainer member 90 includes an aperture 92 and end portion 88 is received in aperture 92 and wrapped around the retainer member in a loop 94 with a sleeve 96 to secure that loop to the retainer member. In other embodiments, the retainer member may be attached or fixedly attached to a cross bearer.

In the example shown in FIGS. 5-6, closure assembly 68 further includes a securing assembly 98 that secures sealing member 72 to closure member 70. The securing assembly includes a base nut 100, a threaded shaft 102, an elongate securing member 104, and a securing nut 106. The base nut is welded to closure member 70. Threaded shaft 102 includes threads that correspond to the thread of the base nut and is received in the base nut. Elongate securing member 104 includes a hole 107 that receives the threaded shaft. Additionally, the elongate securing member spans and contacts opposed end portions of the sealing member (without completely covering hole 82). Securing nut 106 includes threads that corresponds to threads of threaded shaft 102 such that the threaded shaft is received in the securing nut. As best shown in FIG. 6, elongate securing member 104 is disposed between base nut 100 and securing nut 106 allowing a user to selectively remove securing nut 106 to disassemble securing assembly 98.

Although securing member 104 is shown to be an elongate plate, the securing member may be any suitable shape (s). For example, securing member 104 may be cylindrical with hole to allow the tethering member to be attached to the closure member. Additionally, although closure assembly 68 is shown for a circular cleanout opening 48, the closure assembly may be for cleanout openings of other shapes, such as oval, elliptical, square, rectangular, etc.

Figure 7:
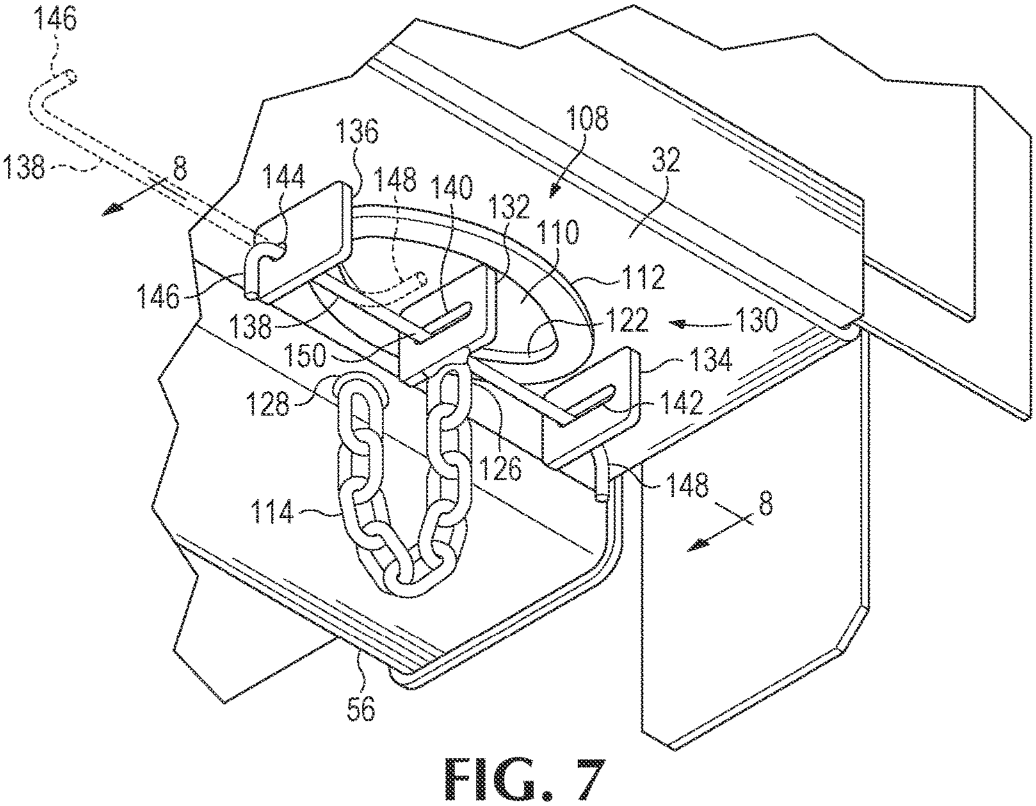
FIG. 7 is a partial isometric view of the open top gondola railcar of FIG. 1 showing another example of a closure assembly for a cleanout opening.
Figure 8:
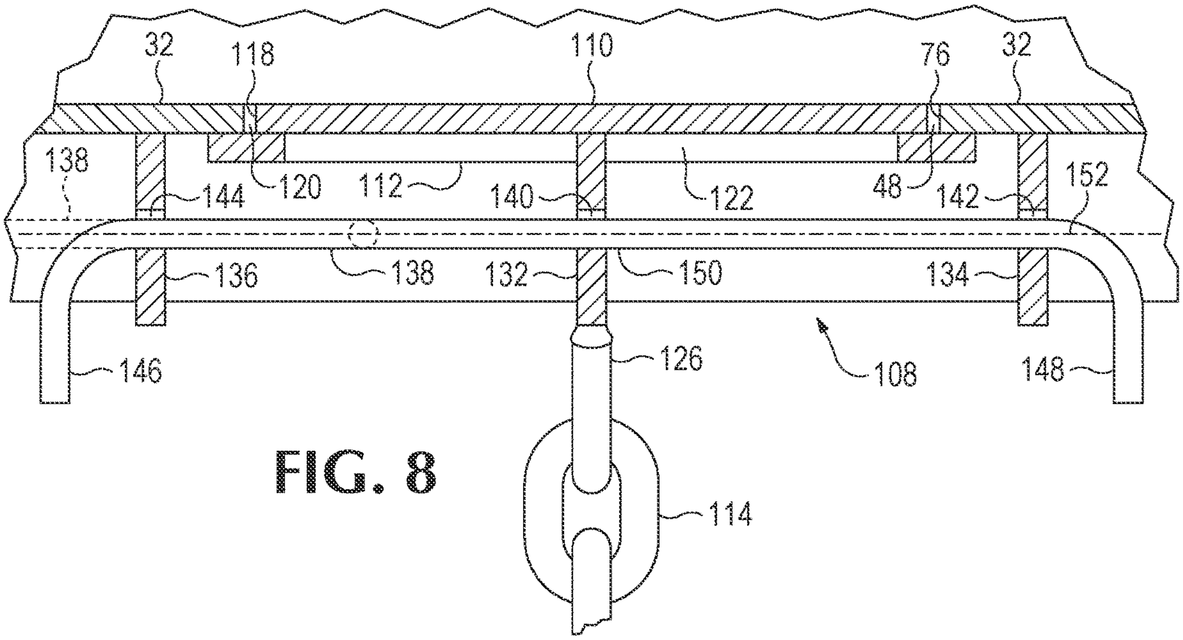
FIG. 8 is a sectional view of the manway assembly of FIG. 7, showing the closure member of FIG. 7 taken along lines 8-8 in FIG. 7.

Referring to FIGS. 7-8, a second embodiment of closure assembly 50 for cleanout opening 48 is generally indicated at 108. The closure assembly includes a closure member 110, a sealing member 112, and a tethering member 114. Closure member or cover member 110 corresponds to the shape of cleanout opening 48. In the example shown in FIGS. 7-8, clean-out opening is elliptical so closure member 110 has an elliptic cylinder shape having a thickness or height that is the same as the thickness or height of a floor perimeter 76 that defines cleanout opening 48. Because closure member 110 is the same thickness or height, closure member 110 is co-planar with floor perimeter 76 when received in cleanout opening 48. Closure member 110 includes a closure perimeter 118 and is sized to be received in cleanout opening 48 and to span a substantial portion (or almost all) of the cleanout opening, such as about 97%, 98%, or 99% of the diameter. In other words, the width or diameter of the closure member is only slightly less than the width or diameter of cleanout opening 48 leaving only a small gap 120 between floor perimeter 76 and closure perimeter 118.

Sealing member 112 is fixedly attached to, or formed with, closure member 110 and is sized to span between floor perimeter 76 and closure perimeter 118. In other words, the sealing member covers gap 120 to seal cleanout opening 48 and prevent material from leaving internal compartment 46 via cleanout opening 48. Sealing member 112 contacts floor perimeter 76 when closure member 110 is received in cleanout opening 48. Additionally, sealing member 72 includes a hole 122 allowing tethering member to be attached to closure member 70. The sealing member can be any suitable shape(s). In the example shown in FIGS. 7-8, sealing member 112 is annular or elliptic ring-shaped that is fixedly attached to, or formed with, closure perimeter 118 of closure member 110.

Tethering member 114 may be a cable, chain, and/or other structure having opposed longitudinal end portions 126 and 128. In the example shown in FIGS. 7-8, tethering member 114 is a chain. End portion 126 is received in hole 122 and is fixedly attached to closure member 110, while end portion 128 is attached to floor 32 and/or one or more cross-bearers 56. In the example shown in FIGS. 7-8, end portion 128 is directly attached to a cross-bearer 56, such as via one or more welds. In other embodiments, end portion 128 may be directly attached or fixedly attached to the floor.

As shown in the example of FIGS. 7-8, closure assembly 108 further includes a locking mechanism 130 that secures or locks closure member 110 in cleanout opening 48. The locking mechanism includes a closure flange 132, opposed proximal and distal flanges 134 and 136, and a locking member 138. The flanges are planar in FIGS. 7-8 but may be non-planar in other embodiments. Closure flange 132 is fixedly attached to closure member 110 and is disposed between the closure member and end portion 126 of tethering member 114. The closure flange includes a first elongate hole 140. Proximal flange 134 is fixedly attached to floor 32 adjacent to cleanout opening 48. The proximal flange includes a second elongate hole 142 having dimensions the same or substantially similar to first elongate hole 140. Distal flange 136 is fixedly attached to floor 32 adjacent to cleanout opening 48 and opposed to proximal flange 134. In other words, cleanout opening 48 is disposed between the proximal and distal flanges. Distal flange 136 includes a third hole 144, such as a circular hole or another hole having dimensions substantially smaller than the dimensions of the first and second elongate holes.

Locking member 138 is elongate and sized to be received in first elongate hole 140, second elongate hole 142, and third hole 144. The locking member includes opposed longitudinal end portions 146 and 148 and a central portion 150 disposed between end portions 146 and 148. The central portion defines a longitudinal axis 152. In the example shown in FIGS. 7-8, longitudinal end portions 146 and 148 are perpendicular from central portion 150. In other embodiments, longitudinal end portions 146 and 148 are obtuse and not perpendicular to the central portion. Longitudinal end portions 146 and 148 have a length that is less than the length of first elongate hole 140 and that is less than the length of second elongate hole 142.

Locking member 138 is movable between a locking position (shown in solid lines in FIGS. 7-8) and an unlocking position (shown in dashed lines in FIGS. 7-8) in which locking member is rotated about ninety degrees from what is shown in solid lines in FIGS. 7-8 to allow a user to slide locking member 138 out of the first and second elongate holes. Once longitudinal end portion 148 is removed from the first and second elongate holes and is adjacent third hole 144, the user can pivot locking member 138 about ninety degrees about an axis perpendicular to longitudinal axis 152 to allow the user to slide locking member 138 out of third hole 144.

Although locking mechanism 130 is shown to include the elongate locking member with bent portions and the flanges having holes, other embodiments of locking mechanism 130 may include locking member 138 having one or more differently-shaped end portions and flanges having holes that correspond to those differently-shaped end portions. Additionally, although closure assembly 108 is shown for an elliptical cleanout opening 48, the closure assembly may be for cleanout openings of other shapes, such as circular, oval, square, rectangular, etc.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. An open top gondola railcar, comprising:

(a) a floor having opposed sides and opposed ends;

(b) opposed side walls attached to the opposed sides of the floor;

(c) opposed end walls attached to the opposed ends of the floor;

(d) a plurality of spaced cross bearers attached to the floor, wherein the floor, the opposed side walls, the opposed end walls, and the plurality of spaced cross bearers define a car body having an internal compartment and a pair of opposed ends;

(e) a pair of wheeled trucks supporting the car body, each of the trucks being located adjacent a respective one of the pair of opposed ends;

(f) one or more cleanout openings of the floor, the one or more cleanout openings each defined by a floor perimeter; and (g) a closure assembly for each of the one or more cleanout openings, the closure assembly including:

(1) a closure member that includes a closure perimeter and is sized to be received in a respective cleanout opening of the one or more cleanout openings, the closure member, when received in the respective opening, spans a substantial portion of the respective cleanout opening to define at least one gap between the closure perimeter and the floor perimeter, (2) a sealing member fixedly attached to, or formed with, the closure member and having a hole, the sealing member, when the closure member is received in the respective cleanout opening, spans between the floor perimeter and the closure perimeter to cover the at least one gap, and (3) a tethering member having opposed first and second end portions, the first end portion being received in the hole of the sealing member and fixedly attached to the closure member and the second end portion being attached to one of the floor or a cross bearer of the plurality of spaced cross bearers.

2. The railcar of claim 1, wherein the tethering member is a cable.

3. The railcar of claim 2, further comprising a retaining member fixedly attached to one of the floor or a cross bearer of the plurality of spaced cross bearers, the retaining member having an aperture.

4. The railcar of claim 3, wherein the second end portion of the cable is received in the aperture and wrapped around the retaining member.

5. The railcar of claim 1, wherein the tethering member is a chain and the second end portion is fixedly attached to one of the floor or a cross bearer of the plurality of spaced cross bearers.

6. The railcar of claim 1, further comprising a locking mechanism that secures the closure member in the respective cleanout opening.

7. The railcar of claim 6, wherein the locking mechanism includes:

a first planar flange disposed between the closure member and the second end portion of the tethering member and fixedly attached to the closure member and the second end portion, the first planar flange having a first elongate hole;

a second planar flange fixedly attached to the floor adjacent to a cleanout opening of the one or more cleanout openings, the second planar flange having a second elongate hole having same dimensions as the first elongate hole;

a third planar flange fixedly attached to the floor adjacent to the cleanout opening, the third planar flange being positioned such that the cleanout opening is disposed between the second and third planar flanges, the third planar flange having a third circular hole; and an elongate locking member received in the first, second, and third holes and movable between a locking position in which the locking member is prevented from being removed from the first, second, and third holes, and an unlocking position in which the locking member is removable from the first and second holes.

8. The railcar of claim 7, wherein the elongate locking member is an elongate bar having opposed bent end portions, each of the bent end portion having a length that is less than the length of each of the first and second elongate holes to allow removal of the locking member from the first and second holes when the locking member is in the unlocking position.

9. The railcar of claim 7, wherein the elongate locking member includes a central portion disposed between the bent end portions, the bent end portions being perpendicular to the central portion.

10. The railcar of claim 1, where the sealing member is fixedly attached to the closing member, the closure assembly further including a securing assembly that secures the sealing member to the closure member.

11. The railcar of claim 10, wherein the securing assembly includes:

a base nut fixedly attached to the closure member;

a threaded shaft received in the base nut;

an elongate securing member having a hole that receives the threaded shaft; and a securing nut received in the threaded shaft, the threaded shaft having threads that correspond with threads of the base nut and the securing nut, and the elongate securing member being disposed between the base nut and the securing nut.

12. The railcar of claim 11, wherein the elongate securing member spans and contacts opposed end portions of the sealing member.

* * * * *